March 3, 1953 M. I. TAYLOR 2,629,885
COMBINED HONEYCOMB FILLER AND HONEY HEATING MACHINE
Filed May 16, 1949 2 SHEETS—SHEET 1
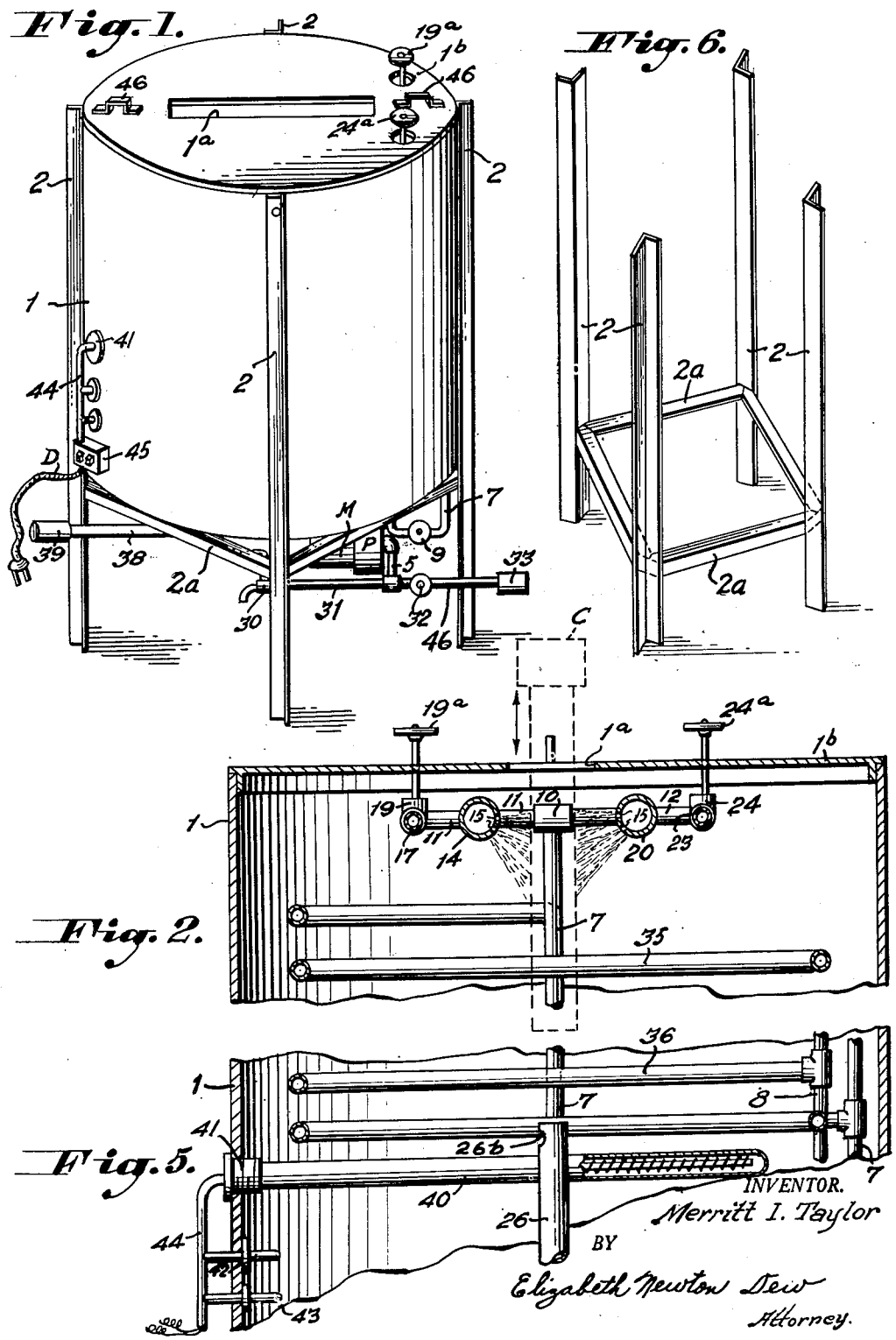
INVENTOR.
Merritt I. Taylor
BY
Elizabeth Newton Dew
Attorney.

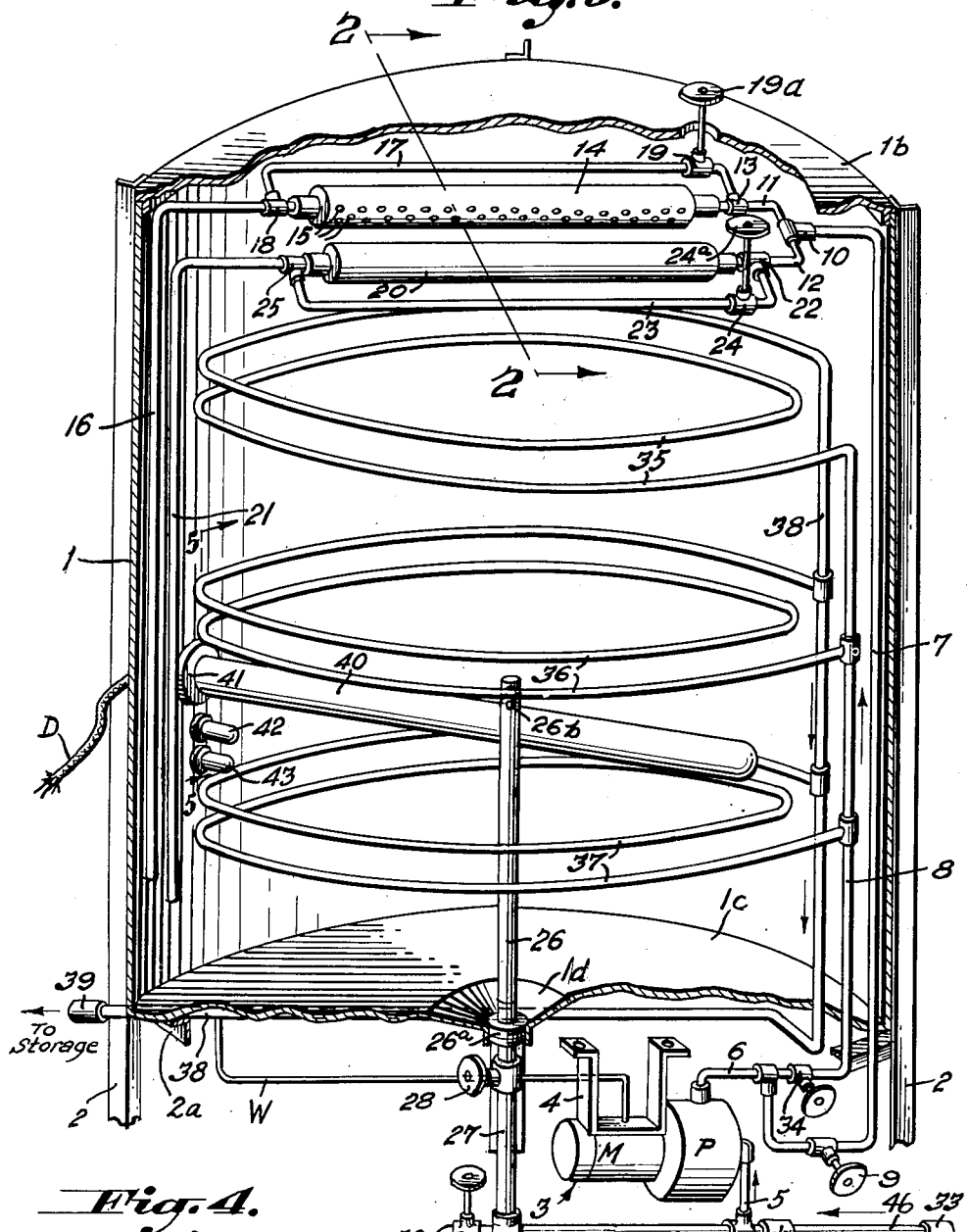

Patented Mar. 3, 1953

2,629,885

UNITED STATES PATENT OFFICE 2,629,885

COMBINED HONEYCOMB FILLER AND HONEY HEATING MACHINE

Merritt I. Taylor, Richmond, Va.

Application May 16, 1949, Serial No. 93,442

4 Claims. (Cl. 6—12)

This invention relates to a machine intended to facilitate the work of beekeepers. It is customary at times to supply food to colonies of bees in the form of drawn comb filled with a liquid honey or a mixture of sugar syrup, pollen and sulfa-thiazole. The purpose of such mixture is two-fold. First, it affords each colony with food at such times as the supply of honey and pollen is inadequate. At the same time, the sulfa-thiazole acts to preserve the health of the colony by prevention of American foul brood and other ailments.

The filling of the drawn comb has heretofore been a tedious, expensive, and time-consuming job. The comb has thousands of cells in back-to-back relation opening outwardly and at a small degree upwardly on both sides of the comb. My invention takes advantage of this fact to rapidly, automatically, and efficiently fill the comb cells with the sugar syrup-pollen-sulfa-thiazole. This constitutes one of the main objects of the invention.

A second main object is to provide a machine which can be alternatively used to rapidly heat liquid honey to the desired temperature to prevent granulation and fermentation, to clear it, to reduce its viscosity, facilitate separation of wax and render the warmed liquid easy to bottle for sale.

Another object is to afford a dual-purpose machine which can be easily operated and controlled and quickly switched from one function to the other.

Other objects and advantages will be obvious from a study of the following description in connection with the accompanying drawing wherein:

Figure 1 is a perspective view of the complete machine.

Figure 2 is a vertical cross section to an enlarged scale, of the upper part of the tank taken in a plane indicated by the line 2—2 of Figure 3.

Figure 3 is a perspective view of the complete machine, the tank being broken away to show the inner arrangement of coils, jet pipes, heater, thermostats, motor-pump unit and piping connections;

Figure 4 is a detail view to an enlarged scale of a broken section of one of the jet pipes showing the staggered arrangement of the jet-forming holes therein.

Figure 5 is a diametrical cross section of the mid-portion of the tank showing the relation of the central or middle heating coil, heater unit, stand-pipe and thermostats, parts being broken away, and Figure 6 is a perspective view of the tank-supporting frame.

Referring in detail to the drawing, 1 identifies a tank or container, shown as cylindrical, about twenty-four to twenty-six inches in diameter, and of proportional height. The tank is supported above the floor in any suitable manner, as by legs 2. An elongated slot 1a is formed in the removable cover 1b of the tank. Slot 1a has a length and width for example, 12" by 2", sufficient to allow a standard honeycomb frame C of 12" width to pass therethrough as indicated in dotted lines upon Figure 2.

A motor-pump unit generally identified by the numeral 3 is supported by a bracket 4 carried by a frame, not shown, in turn supported by horizontals 2a, Figure 6. The unit 3 consists of a motor M supplied by current through cord W. A pump P is direct connected with motor M and has a suction or intake pipe 5 and a discharge pipe 6.

Two liquid supply branches 7 and 8 extend from pipe 6. Branch 7 has a valve 9 therein and then extends upwardly through a liquid-tight joint in the bottom of the tank 1, to a T 10. Pipe connections 11 and 12 lead from T 10 and collectively form a header. Connection 11 extends through a T 13 to a jet pipe 14 fixed in position within the tank below and in parallel relation with the edges of slot 1a. This jet pipe has a plurality of rows of holes 15. Two rows are shown in the model illustrated and it will be noted from Figure 2 that the upper row is located substantially in the horizontal plane through the axis of the pipe 14. The total angle subtended between the top and bottom rows of holes, about the axis of the pipe, is of the order of 10° to 15°. From a T 18 at the other end of pipe 14, a discharge or exhaust pipe section 16 leads to the bottom of the tank. A by-pass section 17 extends between T's 13 and 18, as clearly shown upon Figure 3, and has a valve 19 therein with a handwheel 19a operable from the outside of the tank. Where the temperature and supply pressure are constant, the rate of flow through the jet orifices in pipe 14 may be controlled by regulating valve 19 to thereby vary the rate of flow of liquid through by-pass 17.

The remaining jet pipe 20 and its fluid pressure connections from supply branch 7 to discharge pipe 21 may be duplicates of the corresponding parts just described so that it will be sufficient to identify T 22, by-pass 23, valve 24 and T 25. The number of rows of holes and the number of holes in each row, are the same for both pipes 14 and 20. All holes are of the same diameter which may be about 1/32" to 1/16", depending on operating pressure, temperature and conditions of use. The holes in pipe 20 face inwardly and downwardly in an allochiral position to those in pipe 14. Pipes 14 and 20 are parallel as shown and are horizontally spaced a distance sufficient to give ample clearance on each side for a standard comb frame to be passed vertically therebetween.

The bottom 1c of tank 1 has a depression 1d apertured to receive a bushing 26a fixed therein in any suitable manner. A standpipe 26 is removably threaded into the bushing within the tank. This standpipe extends upwardly and at its top has one or more drain holes 26b as shown. These holes are so located vertically relatively to an electric heater 40, subsequently described, that the liquid cannot fall below the level of the heater during operation.

A pipe section 27 having a valve 28 therein, is threaded into bushing 26a below the tank and communicates with a drain 29 having valve 30 therein as well as with a pipe 31 leading to pump suction pipe 5. As will be obvious from inspection of Figure 3, suction pipe 5 may also be placed in communication by a pipe 46 and coupling 33, with a settling tank, not shown. When it is desired to clean and flush the tank, standpipe 26 is unscrewed and valves 28 and 30 opened as desired to completely drain the tank.

The branch or header 8 has previously been identified. This header communicates with one end of upper, center and lower circular coils 35, 36 and 37, respectively. The three coils are supported in approximately uniformly and vertically spaced relation within the tank. Each coil preferably consists of a plurality of convolutions extending about the walls of the tank. The other end of each of the coils communicates with an outlet header 38 extending downwardly through the bottom 1c of the tank and adapted to be connected, as by a coupling 39, with a pipe, not shown, leading to a storage tank or bottling machine. A valve 34 is located in header 8 closely adjacent the pump.

A heater element 40 shown as a simple immersion type is threaded through a bushing 41 in the wall of the tank at a level a little below center coil 36 and the top aperture of standpipe 26, as previously explained. The heater is controlled by thermostats 42 and 43 shown as located on the interior wall of the tank below bushing 41. The thermostats are designed and connected in a manner well known in the art, so that one of them closes the circuit to heater 40 when the temperature of the liquid in tank 1 is below or drops to a predetermined value, say 110° F. while the other thermostat opens the circuit to heater 40 when the temperature of the liquid rises above a predetermined value, say 120° F. Current for heater 40 and motor M is supplied by a cable D extending to a double switch box 45. One switch controls the heater 40 and the other controls motor M.

In operation, when it is desired to use the machine for filling drawn comb with honey or sugar-pollen-sulfa-thiazole solution, the tank is filled with water and the ingredients are placed in the tank. Or they may be mixed before placing in the tank. The proper switch at 45 is thrown to energize heater 40 and the high and low limit controls. While the liquid is being brought up to operating and mixing temperature, valves 9 and 28 are opened, while valves 30, 32 and 34 are closed. As soon as the liquid is at the proper operating temperature, the motor switch in box 45 is closed. The pump P is now driven to draw liquid from the tank by way of pipes 26, 27, 31 and 5 and to force it under pressure through pipes 6, 7, 11 and 12, and thence to jet pipes 14 and 20. The liquid is then forced from the apertures 15 in pipes 14 and 20 in the form of a large number of fine jets or streams inwardly and downwardly directed. The operator then takes a frame of empty comb or an empty comb frame and moves it downwardly into the tank through slot 1a and between the two jet pipes. As these pipes are about the same length as the width of the frame, one pass of the frame downwardly and then upwardly, is sufficient to completely fill the cells of the comb with fluid. Any excess fluid drops back into the tank and is recirculated. Valves 19 and 24 may be regulated as desired so that substantially the correct amount of liquid will be forced from each jet to fill the comb at one pass and without substantial excess. The heater maintains the liquid at substantially constant temperature and viscosity. In this way the comb may be rapidly and completely filled with the liquid. When more liquid is required when the level drops below the intake openings of standpipe 26, more may be poured in after lifting off top 1b; or it may be forced in from a remote supply tank connected with pipe 46, by closing valve 28 and opening valve 32. The pump then draws in liquid and forces it through pipe 7. At this time valves 19 and 24 will be fully opened so that the liquid will largely by-pass jet pipes 14 and 20 and pass directly through discharge pipes 16 and 21 to the tank.

When the machine is to be used for bottling honey, valves 9 and 28 are closed and 32 and 34 are opened. The tank is filled with water and the heater is energized. At this time pipe 46 is connected with a settling tank or other receptacle, not shown, containing strained honey to be bottled, while connection is made at 39 with a bottling or filling machine of known construction. When motor M is then started, pump P acts to draw honey from the receptacle and to force it through pipes 6 and 8 to coils 35, 36 and 37. As the honey passes through these coils, it is heated by the water in the tank the temperature of which is maintained by the on and off controls and its viscosity is reduced to a point at which it can be easily and quickly bottled.

I have thus provided a dual purpose machine which is of great utility to beekeepers and which can be quickly changed from one use to the other. By unscrewing standpipe 26, the tank can be easily kept in a clean and sanitary condition while the constant temperature control assures uniformity of operation at all times.

While I have shown a preferred form of the invention, various modifications and rearrangement of component parts will occur to those skilled in the art after a study of the foregoing disclosure. For example, more than one heater element 40 may be used while the number arrangement and locations of the heating tubes, valves and wiring can be varied in number of ways. If desired a thermometer can be mounted at a convenient point on the tank wall with its heat-responsive element inside the tank to be responsive to the temperature of the liquid therein. Top 1b is provided with handles 46 for ease of removal. The foregoing disclosure is therefore to be taken in an illustrative sense; and it is my desire and intention to reserve all modifications falling within the scope of the subjoined claims.

Having now fully disclosed the invention, what I claim and desire to secure by Letters Patent is:

1. In a sugar syrup mixing and comb-filling machine, a fluid container having a top, there being a slot with straight parallel edges in said top, a pair of pipes mounted in said container, each pipe being below and parallel with a respective edge of the slot, the parallel axes of said pipes determining a normally horizontal plane, there being a row of longitudinally and closely spaced holes in each pipe in said plane, the holes of each row being directed downwardly in the direction toward the other pipe, a fluid pump, a motor driving said pump, and a fluid-tight pressure discharge connection from said pump to both said pipes, each said row of holes extending over a distance substantially equal to the width of a standard honey-comb frame.

2. In a machine for filling a frame of drawn comb with syrup solution, a tank, a pair of laterally spaced horizontal jet pipes mounted within said tank below and adjacent the top, each said pipe having at least one longitudinally-extending row of closely spaced holes, the holes of each pipe being directed toward the other pipe, each row of holes extending over a distance substantially equal to the width of a standard honey-comb frame, a single supply header connecting said pipes at one end, a discharge pipe leading from the other ends of said jet pipes to the bottom of the tank, a by-pass connection between said header and the respective discharge pipe, a control valve in said by-pass connection, a liquid pump having inlet and discharge openings, a conduit connecting the discharge opening of said pump and said supply header, and a conduit connecting the bottom of said tank with the inlet opening of said pump.

3. In a device of the class described, a liquid-containing tank having a base, a slotted top, first and second horizontally-spaced, horizontal parallel jet pipes fixed in said tank below and adjacent respective longitudinal edges of the slot in the top of said tank, each of said pipes having a plurality of longitudinal rows of holes, the holes in each pipe being directed downwardly and toward the other pipe, a supply header connecting said pipes at one end, discharge conduits leading from the remaining end of each pipe to the bottom of said tank, by-pass conduits connecting said header with a respective discharge conduit, a valve in each by-pass, a power driven pump in fixed relation wtih said tank and having an intake and a discharge, a standpipe extending upwardly through the base of said tank and having its upper open end approximately half way between the top and bottom of said tank, a pipe from the discharge of said pump to said header, and a pipe connecting the lower end of said standpipe with the intake of said pump externally of the tank.

4. In a device of the class described, a liquid-containing tank having a bottom, a wall and a slotted top, first and second horizontally-spaced, horizontal, parallel jet pipes fixed in said tank below and adjacent respective longitudinal edges of the slot in the top of said tank, each of said pipes having a plurality of longitudinal rows of holes, the holes in each pipe being directed downwardly and toward the other pipe, a supply header connecting said pipes at one end, a discharge pipe leading from the remaining end of each pipe downwardly into said tank, a heating element carried by the wall of said tank and projecting thereinto, a standpipe extending upwardly through the bottom of said tank and having its upper end open and above the level of said heater, a power driven pump in fixed relation with said tank and having an intake connection and a discharge connection, a helically-wound heat exchange tubular coil mounted in said tank adjacent the periphery thereof below said jet pipes, a first fluid pressure supply conduit from the discharge connection of said pump to said header, a second fluid pressure supply conduit from the discharge connection of said pump to one end of said helically-wound coil, a valve in each said first and second conduits, a suction conduit from the lower end of sand standpipe to the intake connection of said pump, and a conduit leading from the other end of said helically-wound tubular coil to the exterior of said tank.

MERRITT I. TAYLOR.

REFERENCES CITED

The following references are of record in the file of this patent:

UNITED STATES PATENTS

| Number | Name | Date |
|---|---|---|
| 1,574,256 | Gallesio-Piuma | Feb. 23, 1926 |
| 2,196,377 | Bailey | Apr. 9, 1940 |
| 2,248,867 | Hallman, Sr. | July 8, 1941 |
| 2,461,766 | Peeps | Feb. 15, 1949 |
| 2,488,089 | Mayo | Nov. 15, 1949 |

FOREIGN PATENTS

| Number | Country | Date |
|---|---|---|
| 197,942 | Great Britain | Jan. 3, 1924 |